United States Patent [19]
Harada et al.

[11] Patent Number: 5,289,571
[45] Date of Patent: Feb. 22, 1994

[54] LAYOUT DISPLAY CONTROL SYSTEM FOR DISPLAYING SIZE OF DISPLAYED TABLE

[75] Inventors: Kayoko Harada, Nagoya; Chiharu Hori, Aichi; Misao Kataoka, Mie; Yuri Usami, Nagoya; Manami Yamada, Seto, all of Japan

[73] Assignee: Brother Kogyo Kabushiki Kaisha, Aichi, Japan

[21] Appl. No.: 649,729

[22] Filed: Feb. 1, 1991

[30] Foreign Application Priority Data

Feb. 1, 1990 [JP] Japan .................... 2-22821

[51] Int. Cl.⁵ .............................. G06F 15/62
[52] U.S. Cl. ..................... 395/148; 395/143
[58] Field of Search ............ 395/148, 149, 145, 143; 340/709, 723; 434/90

[56] References Cited

U.S. PATENT DOCUMENTS

| | | | |
|---|---|---|---|
| 4,980,841 | 12/1990 | Sugitani .................... | 364/518 |
| 4,984,162 | 1/1991 | Torii et al. .................... | 364/518 |
| 5,065,438 | 11/1991 | Hirose et al. .................... | 382/13 |
| 5,157,767 | 10/1992 | Nihei .................... | 395/149 |

FOREIGN PATENT DOCUMENTS

203314 12/1986 European Pat. Off. .

OTHER PUBLICATIONS

Baumgarten et al., *Using Word Perfect* 5.1, 1989, pp. 603-610.

James Fuller, *Using Auto Cad Release* 10 with 3D, 3rd Ed.; 1989; Chapter 13 (pp. 10-14, 4-7).

B. Howard et al., "A 1-2-3 Wish List", PC Magazine, vol. 6, No. 18, 27 Oct. 1987, pp. 154-158.

J. Taylor, "A New Face for Spreadsheets", PC Magazine, vol. 6, No. 22, 22 Dec. 1987, pp. 103-111.

"Method to Vary the Size of a Table", IBM Technical Disclosure Bulletin, vol. 28, No. 2, Jul. 1985, p. 813.

"Method to Interactively Define A Page Size By A Scale Line", IBM Technical Disclosure Bulletin, vol. 28, No. 2, Jul. 1985, p. 834.

*Primary Examiner*—Gary V. Harkcom
*Assistant Examiner*—Joseph H. Feild
*Attorney, Agent, or Firm*—Oliff & Berridge

[57] ABSTRACT

A layout display control system for a document processing apparatus wherein dimensional information of a table is displayed together with the layout of a table to allow the user to recognize specific dimensions of the outer profile of the table when the layout of the table is displayed. Ruled-line data including vertical and horizontal ruled lines are inputted to assemble a table through movement of a cursor on a display. The inputted data is stored in a memory in association with the display positions on the display. When a layout of the table is to be displayed, the data is read out of the memory and is converted to layout data to display the layout of the table. To simultaneously display the dimensional information of the table, at least width and height of an outer profile of the table is calculated based on the data stored in the memory and the dimensions of the outer profile of the table is displayed with specific numerals. Therefore, the user can readily determine whether the table can be printed on a sheet of print paper or not.

11 Claims, 8 Drawing Sheets

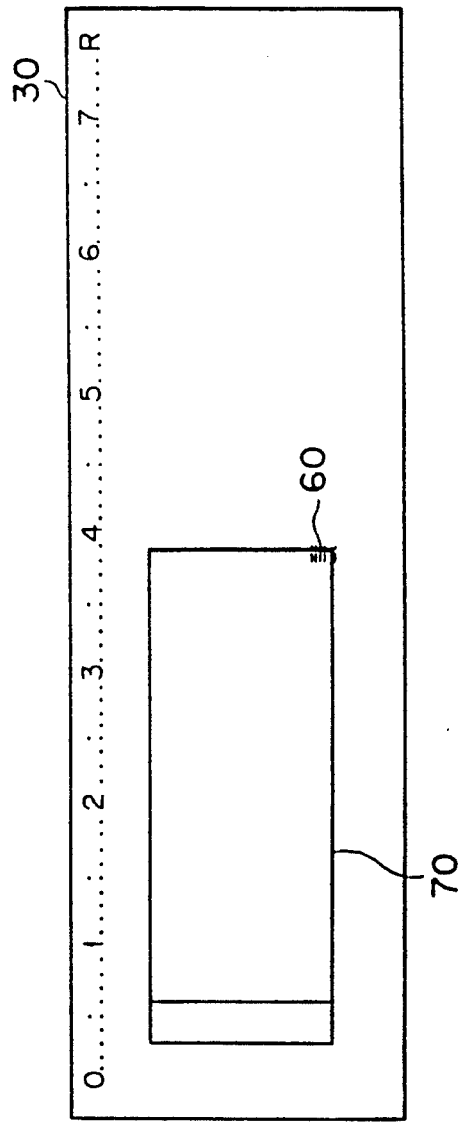

LAYOUT DISPLAY CONTROL SYSTEM FOR DISPLAYING SIZE OF DISPLAYED TABLE

BACKGROUND OF THE INVENTION

The present invention relates to a layout display control system for a document processing apparatus, and more particularly to a layout display control system which simultaneously displays the layout of a table and dimensional information of the outer profile of the table.

English word processors generally have a display for displaying a plurality of lines and also incorporate many functions to facilitate inputting and editing document data. Particularly, some word processors which have become available recently have a document layout display function for displaying the layout of document data per page and a table layout display feature for displaying the layout of a table. Before desired document data or a table is printed, the layout of the document data or the table can be displayed for the user to confirm the appearance of the document data or the table as it is printed.

To display the layout of a table using the table layout display function, the table is first assembled on a table assembly screen, and then a "layout" key is pressed to display the layout of the assembled table.

The word processors with the table layout display function for displaying the layout of a desired table permit the user to see the table before it is printed. However, since the user cannot directly recognize the specific size of the table on the display, the assembled table may not fit in a sheet of print paper when the table is actually printed.

The user can recognize the size of the table with specific numerals by moving the cursor, for example, on the screen with respect to the displayed table. This procedure is however disadvantageous in that a complex process is required to confirm the size of the table in addition to the displaying of the table and an additional period of time has to be consumed to effect the process before the table is printed.

SUMMARY OF THE INVENTION

It is an object of the present invention to provide a layout display control system for a document processing apparatus, which system allows the user to recognize specific dimensions of the outer profile of a table when the layout of the table is displayed.

According to the present invention, there is provided, as shown in FIG. 1 of the accompanying drawings, a layout display control system for a document processing apparatus which comprises display means having a display screen, the display screen being made up of a predetermined number of display positions arranged in line and column; ruled-line data input means for inputting ruled-line data on ruled lines, the ruled-line data including vertical and horizontal ruled lines and being used to assemble a table through movement of a cursor on the display screen; ruled-line data storage means having storage locations corresponding to the predetermined number of display positions, for storing therein the ruled-line data inputted from the ruled-line data input means in association with the display positions on the display screen; layout-display-mode selecting means for selecting a layout display mode to display a layout of the table on the display screen; and layout-display control means for converting the ruled-line data read from the ruled-line data storage means into layout data and displaying the layout of the table based on the layout data when the layout display mode is selected, wherein the layout-display control system comprises calculating means for calculating dimensional information with respect to at least width and height of an outer profile of the table based on the ruled-line data stored in the ruled-line data storage means when the layout of the table is displayed on the display screen in the layout display mode, and dimensional-information-display control means for displaying the dimensional information calculated by the calculating means on the display screen.

The layout-display control means further comprises searching means for searching an uppermost point, a lowermost point, a leftmost point, and a rightmost point on the rules lines based on the ruled-line data stored in the ruled-line data storage means, and the ruled-line data storage means includes a first memory for storing a line or row number indicative of the uppermost point on the ruled-lines, a second memory for storing a line or row number indicative of the lowermost point on the ruled-lines, a third memory for storing a column number indicative of the leftmost point on the ruled-lines, and a fourth memory for storing a column number indicative of the rightmost point on the ruled-lines. The calculating means calculates the height of the outer profile of the table based on the data stored in the first and second memories, and the width thereof based on the data stored in the third and fourth memories.

In the layout display control system according to the present invention, when the layout of the table is displayed on the display means in the layout display mode, the calculating means calculates dimensional information with respect to at least the width and height of the outer profile of the table based on the ruled-line data stored in the ruled-line data storage means. The dimensional-information-display control means displays the dimensional information calculated by the calculating means on the display means.

As described above, the layout display control system according to the present invention has the calculating means and the dimensional-information-display control means. When the layout of the table is displayed on the display, the dimensional information of the table is also displayed at the same time. Therefore, the user can recognize the dimensions of the outer profile of the table with specific numerals, and hence can determine with each whether the table can be printed on a sheet of print paper or not, while viewing the displayed layout of the table.

It is not necessary for the user to confirm the size of the table when the table is to be printed.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 4(a) through 4(f) are diagrams showing types of ruled lines and ruled-line data thereof;

FIG. 7 is a diagram of a table as displayed on a display;

DETAILED DESCRIPTION OF THE PREFERRED EMBODIMENTS

An embodiment of the present invention will hereinafter be described with reference to the drawings. In this embodiment, the present invention is applied to an English word processor.

Figure 1:
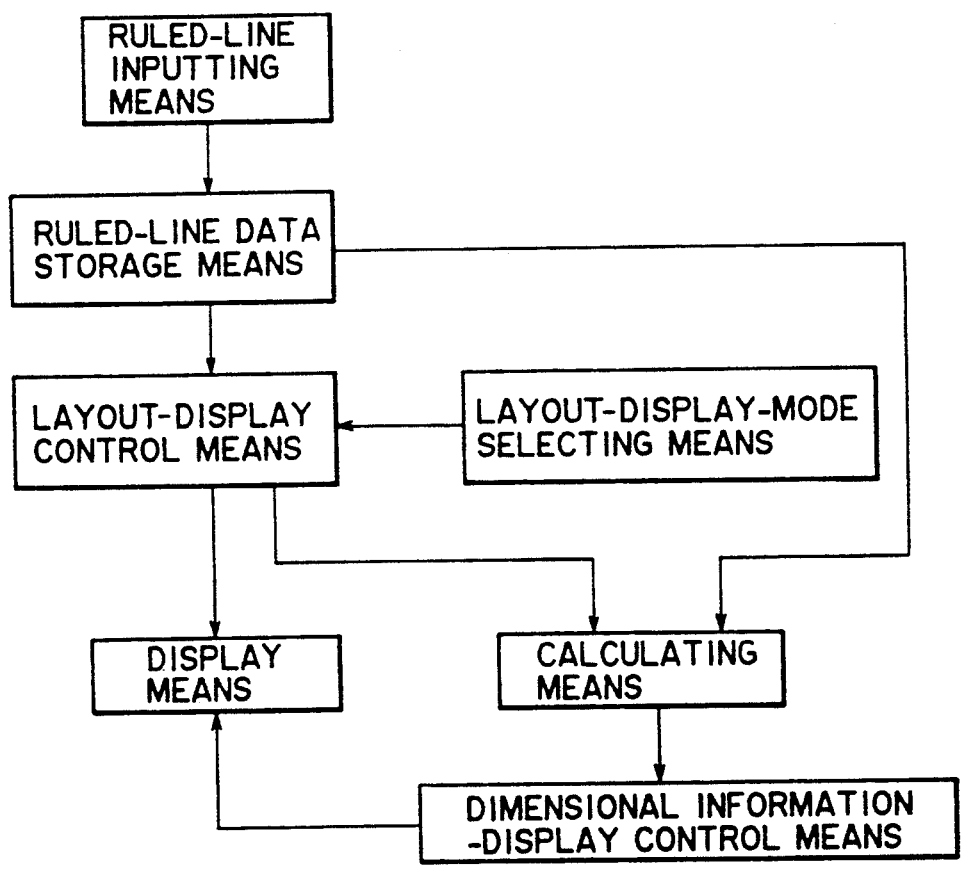
FIG. 1 is a functional block diagram of a layout display control system according to the present invention.
Figure 2:
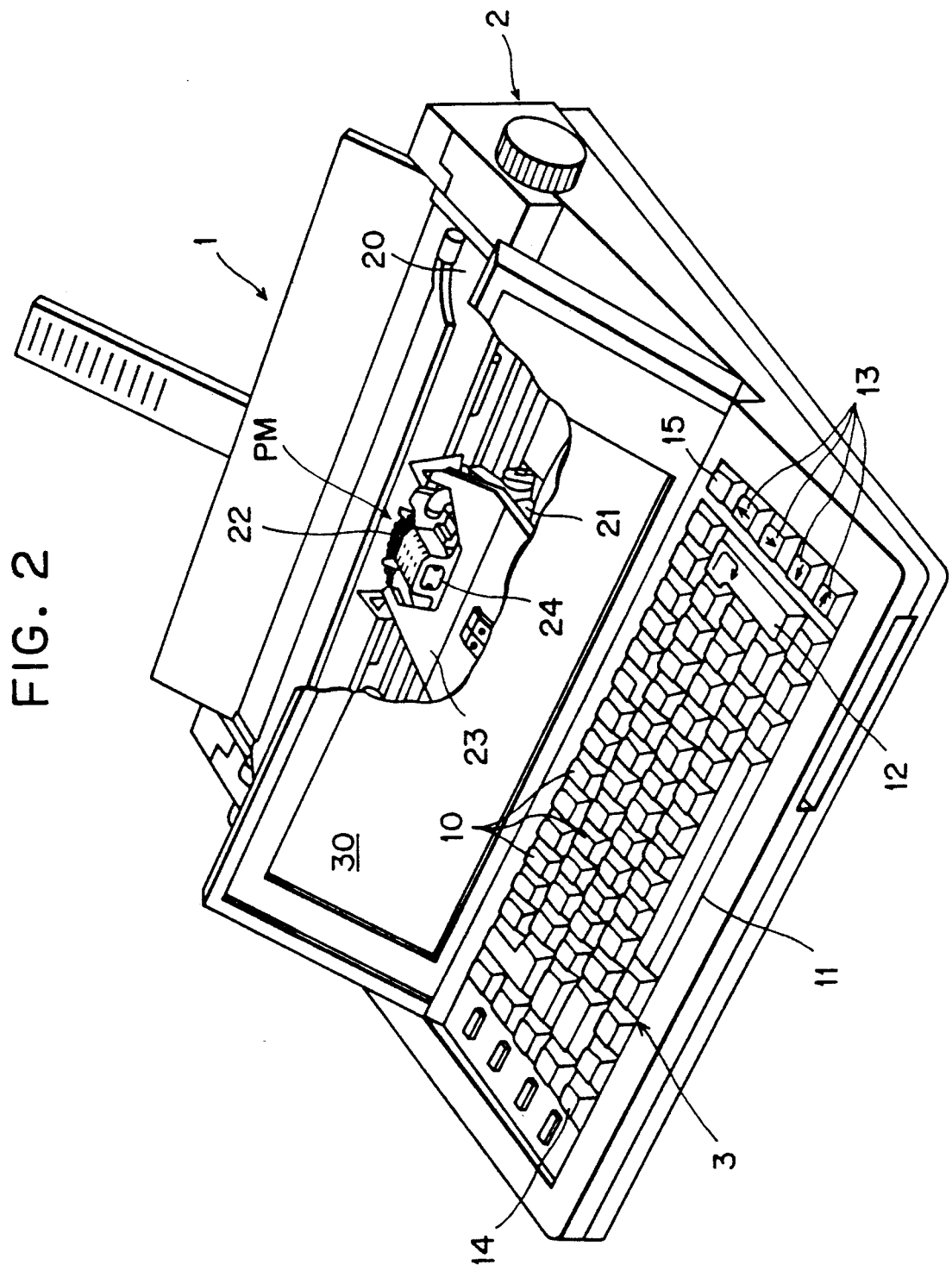
FIG. 2 is a perspective view of a word processor.

As shown in FIG. 2, a word processor 1 has a housing frame 2 supporting a keyboard 3 on a front portion thereof and housing a daisy-wheel printing mechanism PM behind the keyboard 3. The word processor 1 includes a liquid crystal display 30 capable of displaying 14 lines of characters and symbols. The liquid crystal display 30 is positioned behind the keyboard 3 and angularly movable between an operative position shown in FIG. 2 and a storage position.

The keyboard 3 comprises character keys 10 including alphabetical keys and numeral keys, a space key 11, a return key 12, cursor moving keys 13 for vertically and horizontally moving a cursor 60 (FIG. 7) on the display 30, a layout key 14 for selecting a layout display mode to display the layout of a table, a cancel key 15 for canceling the execution of various functions, a ruled-line mode selection key 16 for alternatively and cyclically selecting a registration mode to register ruled lines including vertical and horizontal ruled lines depending on the movement of the cursor when a table is assembled, a deletion mode to delete ruled lines, and a cursor movement mode to move the cursor without registration and deletion of ruled lines, and a ruled-line type selection key 17 for cyclically selecting the types of ruled lines including a single vertical ruled line, a single horizontal ruled line, and double horizontal ruled lines.

The printing mechanism PM is of a general construction composed of a platen, a carriage, and a daisy wheel.

Figure 3:
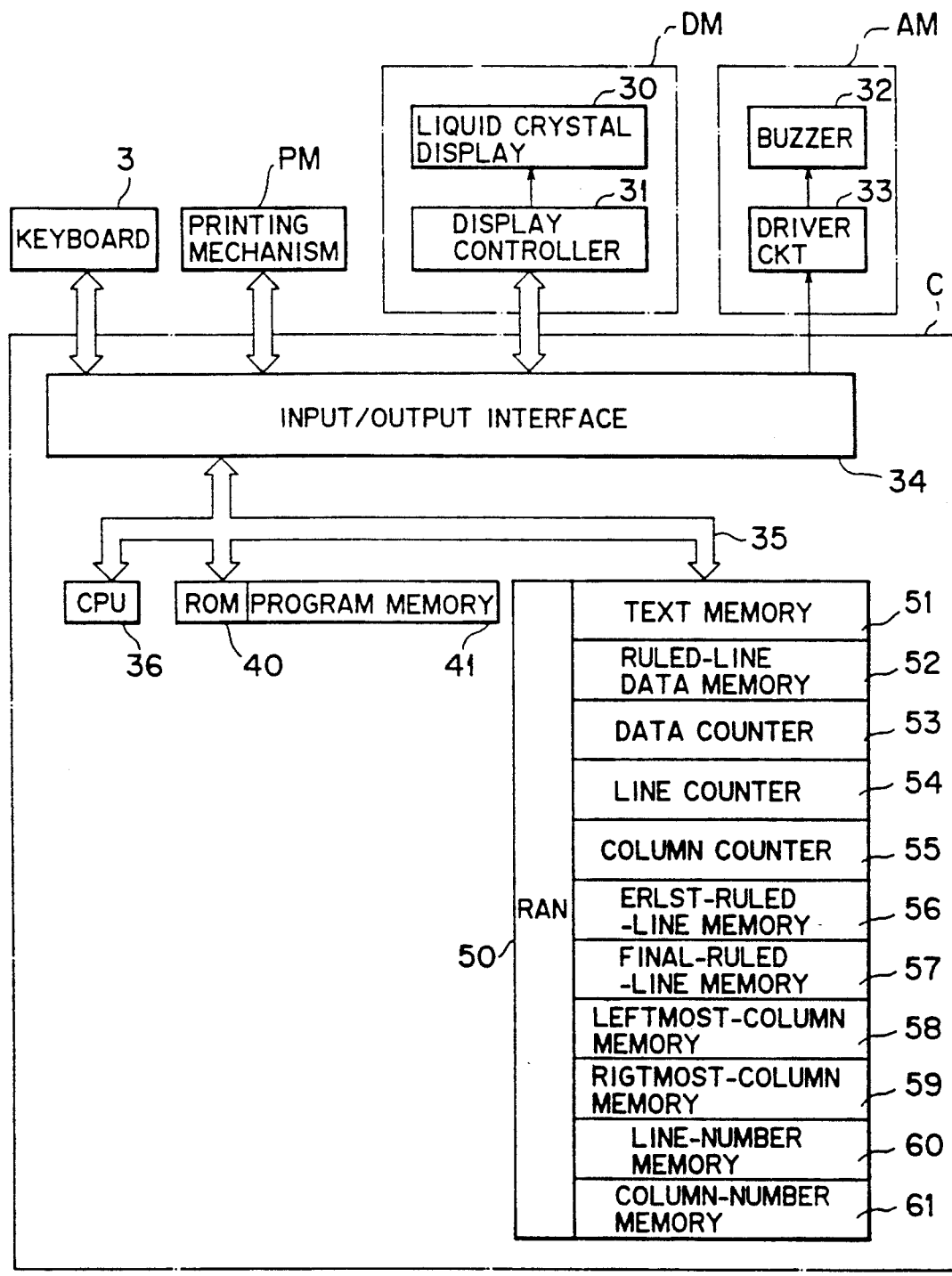
FIG. 3 is a block diagram of a control system of the word processor.

A control system of the word processor 1 will be described with reference to the block diagram of FIG. 3.

The word processor 1 basically comprises the keyboard 3, the printing mechanism PM, a display mechanism DM, an alarm mechanism AM, and a controller C. The keyboard 3, the printing mechanism PM, the display mechanism DM, and the alarm mechanism AM are electrically connected to an input/output interface 34 of the controller C.

The display mechanism DM has a general structure including the liquid crystal display 30, and a display controller 31 including a display RAM for outputting display data and a character generator ROM which stores many dot patterns for characters, symbols, and ruled lines.

The alarm mechanism AM comprises a buzzer 32 and a driver circuit 33 for energizing the buzzer 32.

The controller C comprises a CPU 36, the input/output interface 34 connected to the CPU 36 through a bus 35 such as a data bus, a ROM 40, and a RAM 50.

The ROM 40 includes a program memory 41 which stores a control program for controlling the printing mechanism PM and the display mechanism DM according to code data received from the keyboard 3, a table assembly control program for displaying vertical and horizontal ruled lines on the display play 30 in response to movement of the cursor 60 thereon, thereby assembling a table on the display 30, and a control program for displaying the layout of a table and also calculating and displaying dimensional information with respect to the width and height of the output profile of the table when the layout display mode is selected.

The RAM 50 includes a text memory 51 for storing document data of a plurality of documents which are inputted, a ruled-line data memory 52 having a storage capacity of 74 lines or rows by 135 columns for storing ruled-line data relative to ruled lines, including vertical and horizontal ruled lines, used to assemble tables, the ruled-line data corresponding to matrix display positions for a plurality of raster images to be displayed on the display 30, a data counter 53 for indicating a single address in the ruled-line data memory 52, the data in the data counter 53 being represented sented as a count DC, a line counter 54 for indicating a line or row in the ruled-line data memory 52, the data in the line counter 54 being represented as a line count LC, a column counter 55 for indicating a single column on a line indicated by the line counter 54, a first-ruled-line memory 56 for storing the number of the first line for which first ruled-line data exist in the ruled-line data memory 52, the data in the first-ruled-line memory 56 being represented as a first line Ls, a final-ruled-line memory 57 for storing the number of the final line for which final ruled-line data exist in the ruled-line data memory 52, the data in the final-ruled-line memory 57 being represented as a final line Le, a leftmost-column memory 58 for storing the number of the leftmost column for which leftmost ruled-line data exist in the ruled-line data memory 52, the data in the leftmost-column memory 58 being represented as a column number Cl, a rightmost-column memory 59 for storing the number of the rightmost column for which rightmost ruled-line data exist in the ruled-line data memory 52, the data in the rightmost-column memory 59 being represented as a column number Cr, a line-number memory 60 for storing the vertical dimension or height of the outer profile of a table, the data in the line-number memory 60 being represented as a line number L, a column-number memory 61 for storing the horizontal dimension or width of the outer profile of a table, the data in the column-number memory 61 being represented as a column number C, and various memories for temporarily storing the results of arithmetic operations carried out by the CPU 36.

When one of the cursor movement keys 13 is pressed, the ruled-line data memory 52 stores one byte of ruled-line data for each display position on the display 30, depending modes selected by the ruled-line mode selection key 16 and the ruled-line type selection key 17. As shown in FIGS. 4(a) through 4(f), the stored byte of ruled-line data is indicated by "00H" when there is no ruled line, "01H" when a single horizontal ruled line is instructed, "02H" when double horizontal ruled lines are instructed, "04H" when a single vertical ruled line is instructed, "05H" when a corner composed of a single horizontal ruled line and a single vertical ruled line is instructed, and "06H" when a corner composed of double horizontal ruled lines and a single vertical ruled line is instructed.

Figure 5:
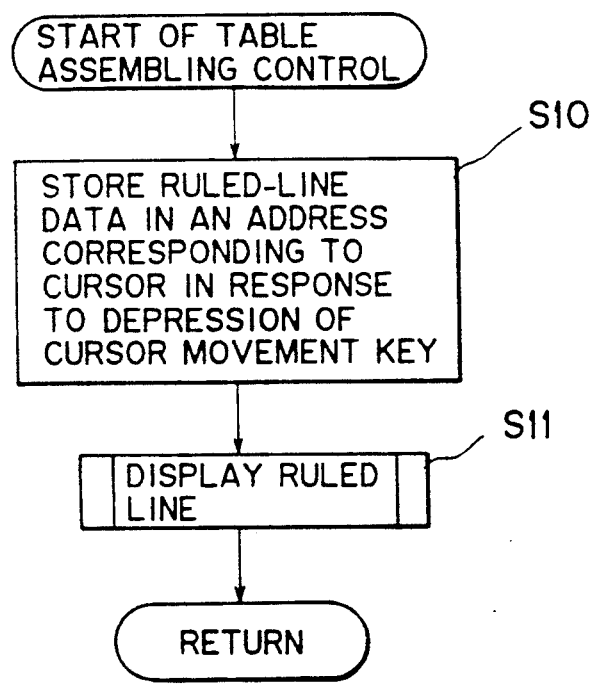
FIG. 5 is a flowchart of a routine for controlling the assembling of a table.
Figure 6A:
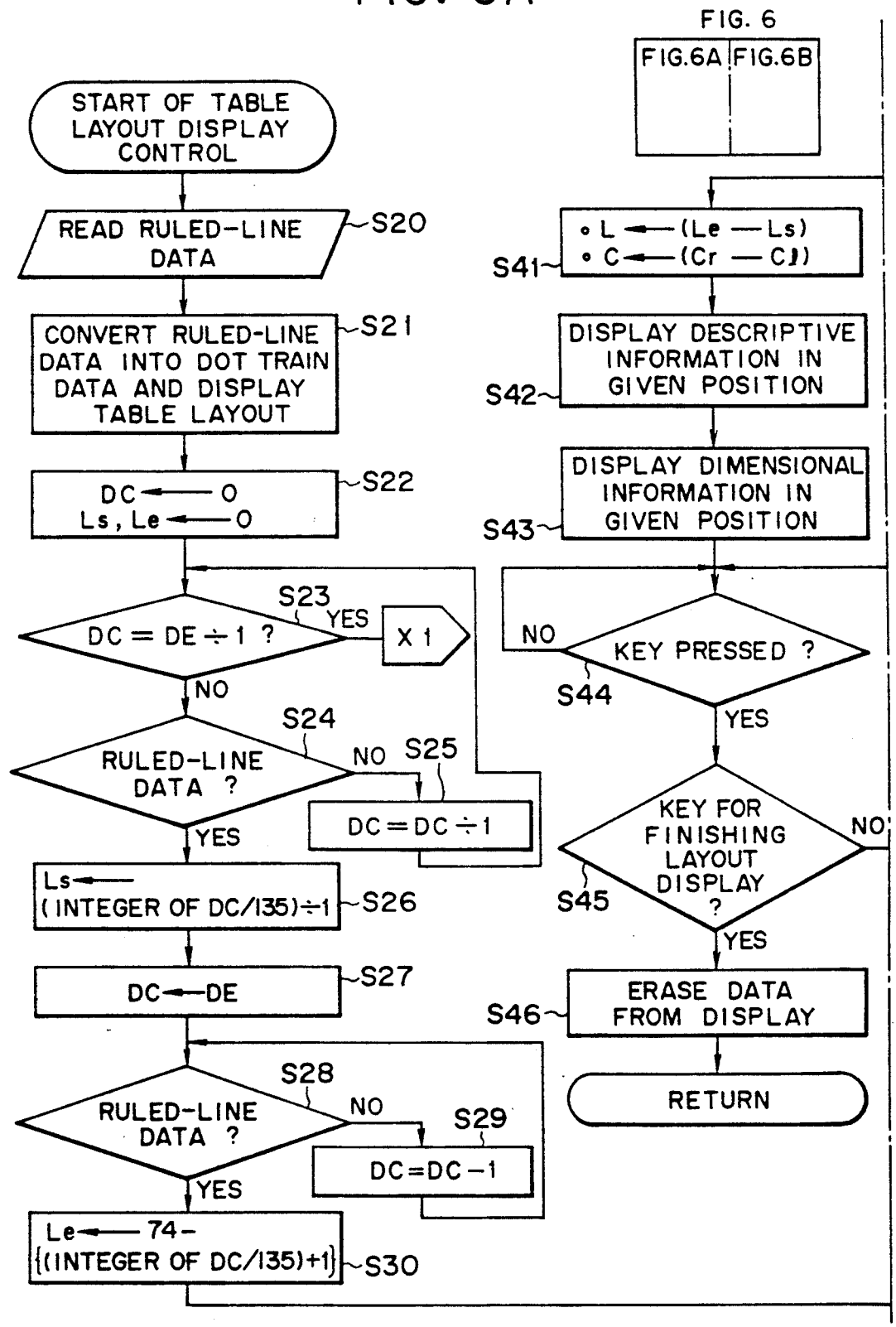
FIG. 6 is a flowchart of a routine for controlling the display of the layout of a table.
Figure 6B:
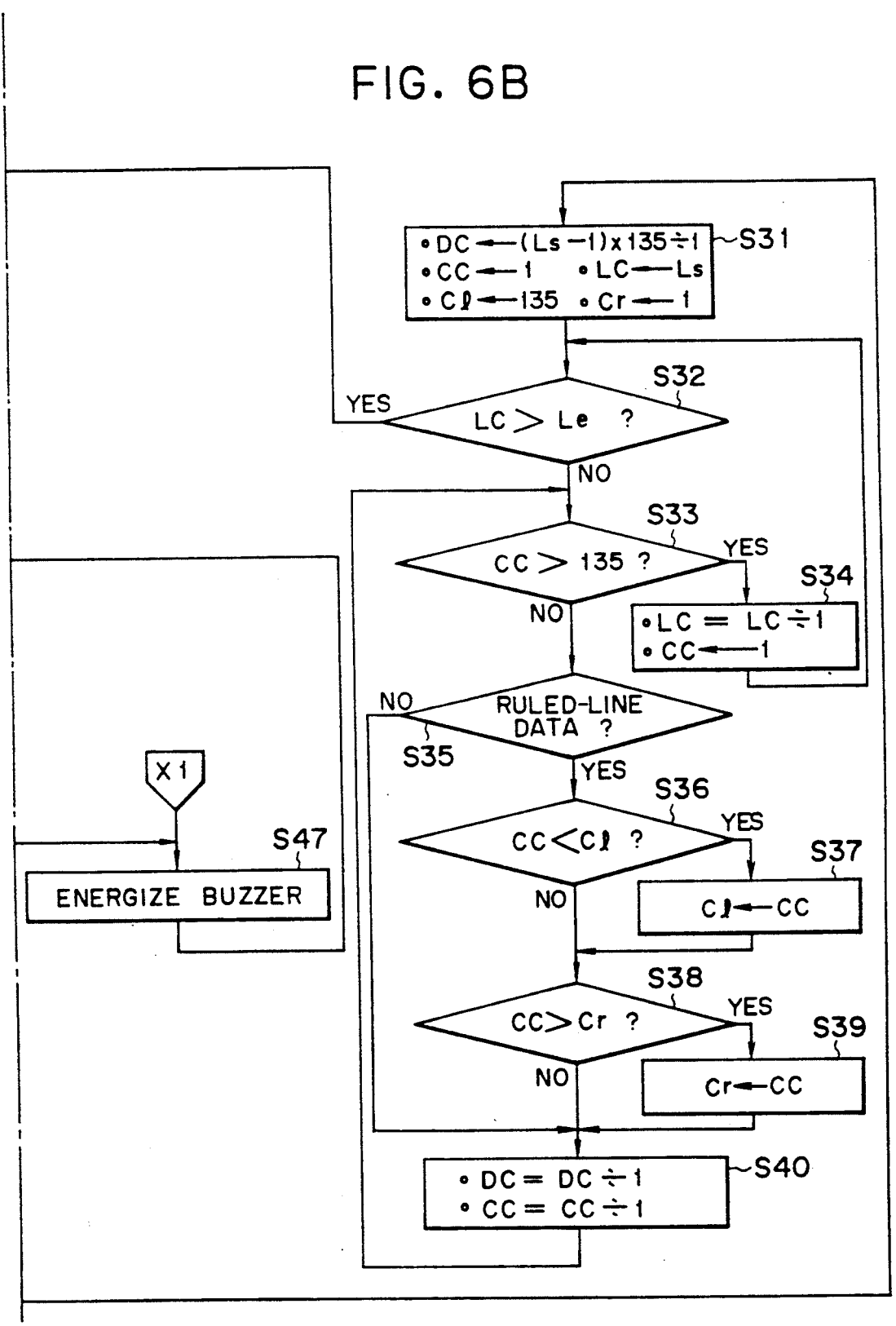

A routine for controlling the display of the layout of a table, which is executed by the controller C of the word processor 1, will be described below with reference to the flowchart of FIG. 6. Prior to the description of the routine for controlling the display of the layout of a table, however, a routine for controlling the assembling of a table will first be described with reference to the flowchart of FIG. 5. Denoted at Si (i=10, 11, ...) in FIGS. 5 and 6 are steps of the routines.

Figures 8, 9:
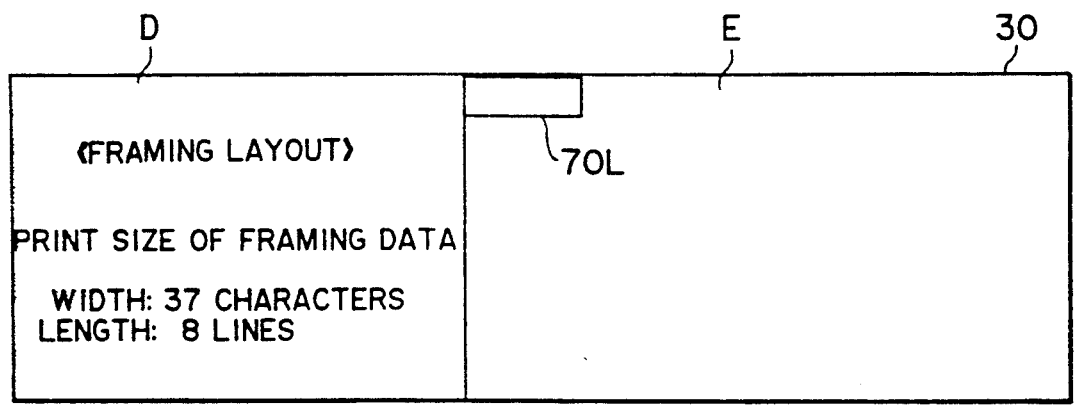
FIG. 8 is a diagram illustrative of ruled-line data as stored in a ruled-line data memory.
FIG. 9 is a diagram illustrative of the manner in which the layout of a table and dimensional information thereof are displayed.

The routine for controlling the assembling of a table is started each time "Table Assembling" is selected on a displayed index and one of the cursor movement keys 13 is pressed. In response to depression of the cursor movement key 13, the cursor 60 moves to and is displayed in an instructed position. Based on the data of the type of a ruled line which is selected by the ruled-line type selection key 17 and the data from the pressed cursor movement key 13, one of the ruled-line data "00H" through "06H" is stored in the ruled-line data memory 52 at an address corresponding to the displayed cursor in a step S10. Then, the ruled-line data read from the ruled-line data memory 52 are supplied to the display controller 31, which reads dot pattern data corresponding to the supplied ruled-line data from the ROM, and stores the dot pattern data in the display RAM. Thus, a corresponding ruled line is displayed on the display 30 at the displayed cursor, in a step S11. For example, as shown in FIG. 7, when a table 70 is assembled which is composed of horizontal ruled lines extending along 3rd and 11th lines from a 3rd column to a 39th column and vertical ruled lines extending along 3rd, 6th, and 39th columns from the 3rd line to the 11th line, ruled-line data as shown in FIG. 8 are stored in the ruled-line data memory 52 at addresses corresponding to the respective display positions on the display 30. Blank addresses shown in FIG. 8 all store the data "00H".

In order to display the layout of the table 70 on the display 30, the layout key 14 is pressed to select the layout display mode. Now, the routine for controlling the display of the layout of the table 70 is started. As shown in FIG. 6, the ruled-line data are successively read from the ruled-line data memory 52 in a step S20. The read ruled-line data are converted into table layout data in the form of dot train data, which are supplied to the display RAM, and a table layout 70L (FIG. 9) is displayed in a layout display area E of the display 30 in a step S21. For example, when the ruled-line data of the table 70 shown in FIG. 8 are stored in the ruled-line data memory 52, the layout 70L of the table 70 is displayed in the layout display area E of the display 30, with one column composed of 2×2 dots, as shown in FIG. 9.

Steps S22 through S43 calculate dimensional information with respect to the width and height of the outer profile of the table 70 and display the dimensional information. More specifically, the count DC, the first line Ls, and the final line Le are reset in a step S22. If the count DC is not equal to the sum of the final address DE of the ruled-line data memory 52 (whose first address is "0") and "1", i.e., if all the data in the ruled-line data memory 52 have not been browsed yet in a step S23 (S23 : No), and if no ruled-line data exist in the address indicated by the count DC in the ruled-line data memory 52 in a step S24 (S24 : No), then the count DC is incremented by "1" in a step S25. If ruled-line data corresponding to the first position of the table 70 are detected in the step S24 (S24 : Yes), then the line number determined by the equation in a step S26 is stored as the first line Ls in the first-ruled-line memory 56 in the step S26.

The final address DE is stored as the count DC in the ruled-line data memory 52 in a step S27. The ruled-line data corresponding to the final position of the table 70 are searched for in a step S28 while decrementing the count DC by "1" in a step S29 (S28 : No). If the final ruled-line data are found in the step S28 (S28 : Yes), then the line number determined by the equation in a step S30 is stored as the final line Le in the final-ruled-line memory 57 in the step S30.

Then, the address corresponding to the first column on the first line Ls is determined according to the equation in a step S31, and stored as the count DC in the step S31. "1" is stored as each of the count CC and the column number Cr, the first line Ls is stored as the line count LC, and "135" (final column number on each line) is stored as the column number Cl in the step S31.

If the line count LC is smaller than the final line Le in a step S32 (S32:No), if the count CC is smaller than "135" in a step S33 (S33:No), and if no ruled-line data exists in the address indicated by the count DC in a step S35 (S35 : No), then each of the count DC and the count CC is incremented by "1" in a step S40. If the count CC is larger than "135" in the step S33 (S33:Yes), then the line count Lc is incremented by "1" and the count CC is set to the first column in a step S34.

If ruled-line data are detected in the step S35 (S35 : Yes) when they are searched for while incrementing the counts DC, CC and the line count LC, then the count CC is set as the column number Cl in a step S37 each time the count CC becomes smaller than the column number Cl in a step S36 (S36 : Yes), and the count CC is set as the column number Cr in a step S39 each time the count CC becomes larger than the column number Cr in a step S38 (S38:Yes).

If the line count LC is larger than the final line Le in the step S32 (S32:Yes), then the line number L indicative of a table height, which is produced by subtracting the first line Ls from the final line Le, is stored in the line number memory 60, and the column number C indicative of a table width, which is produced by subtracting the column number Cl from the column number Cr, is stored in the column number memory 61, in a step S41.

Descriptive information which has been stored and is descriptive of the type of dimensions is read and supplied to the display RAM, and is displayed in a dimensional information display area D, other than the layout display area E, of the display 30, in a step S42. Then, dimensional information composed of the line number L and the column number C is supplied to the display RAM and displayed in the display 30 in a step S43. For example, as shown in FIG. 9, the descriptive information including "FRAMING LAYOUT", "PRINTING SIZE OF FRAMING DATA", "WIDTH: CHARACTERS", and "LENGTH: LINES" is displayed in the dimensional information display area D on the lefthand side of the layout display area E, and the width "36" of the outer profile of the table 70 is displayed within "WIDTH: CHARACTERS" and the height "8" of the outer profile of the table 70 is displayed within "LENGTH: LINES".

If a key for finishing the layout display, such as the cancel key 15, the return key 12, or the layout key 14, is pressed in a step S44 (S44:Yes), then all of the displayed information, such as the table layout 70L, is erased from the display 30 in a step S46, and control then returns to a main routine. If any of other keys than the keys for finishing the layout display is pressed in steps S44, S45 (S44:Yes, S45:No), or if the count DC is equal to the sum of the final address DE and "1" in the step S23 (S23:Yes), then the buzzer 32 is energized in a step S47. The layout of the table 70 may be displayed using layout data in the form of line segments converted from the ruled-line data.

It is possible to modify the routine for controlling the display of the layout of a table such that the width and height of the table 70 are indicated in the unit of "cm" or "mm". It is also possible to display the outer profiles and dimensions of various tables of complex configurations. The dimensional information may be displayed near the table layout 70L that is displayed.

As described above, when the layout 70L of the table 70 is displayed on the display 30, dimensional information regarding the height and width of the outer profile of the table 70 is also displayed at the same time. Therefore, the user can recognize the dimensions of the outer profile of the table with specific numerals, and hence can determine with each whether the table can be printed on a sheet of print paper or not, while viewing the displayed layout of the table.

It is not necessary for the user to confirm the size of the table 70 when the table 70 is to be printed.

The principles of the present invention are also applicable to various document processing apparatus capable of displaying layouts, such as an European-language or Japanese word processor having a thermal printer and a floppy disk drive, and various document processing apparatus having a layout display function and a floppy disk drive for storing data of a plurality of documents in a floppy disk.

What is claimed is:

1. A layout display control system for a document processing apparatus comprising:

display means having a display screen, the display screen being made up of a predetermined number of display positions arranged in rows and columns;

ruled-line data input means for inputting ruled-line data representing a plurality of ruled lines to be displayed, the ruled-line data including vertical and horizontal ruled lines and being used to assemble a table;

ruled-line data storage means having storage locations for storing therein the ruled-line data inputted from the ruled-line data input means, wherein said ruled-line data storing means allocates one of said storage locations for each of said ruled-line data, said one storage location for each of said ruled line data comprising a display position of said predetermined number of display positions in which each of the ruled-line data is displayed;

layout-display-mode selecting means for selecting a layout display mode to change from a which does not display ruled lines to a layout display mode to display a layout of the table on the display screen; and layout-display control means for converting the ruled-line data read from the ruled-line data storage means into layout data and displaying the layout of the table based on the layout data when the layout display mode is selected, wherein said layout-display control system comprises calculating means for calculating dimensional information comprising at least a width and a height of an outer periphery of the table based on the ruled-line data stored in the ruled-line data storage means when the layout of the table is displayed on the display screen in the layout display mode, and dimensional-information-display control means for displaying the dimensional information calculated by said calculating means on the display screen.

2. A layout display control system according to claim 1, wherein said layout-display control means further comprises determining means for determining an uppermost point, a lowermost point, a leftmost point, a rightmost point of the table formed by the ruled lines based on the ruled-line data stored in said ruled-line data storage means.

3. A layout display control system according to claim 2, wherein said ruled-line data storage means includes a first memory for storing a row number indicative of the uppermost point on the ruled-lines, a second memory for storing a row number indicative of the lowermost point on the ruled-lines, a third memory for storing a column number indicative of the leftmost point on the ruled-lines, and a fourth memory for storing a column number indicative of the rightmost point on the ruled-lines.

4. A layout display control system according to claim 3, wherein said calculating means calculates the height of the outer periphery of the table based on the data stored in said first and second memories, and the width thereof based on the data stored in the third and fourth memories.

5. A layout display control system according to claim 4, wherein said dimensional-information-display control means displays the height of the outer periphery of the table by displaying a row number and the width of the outer periphery of the table by displaying a column number.

6. A layout display control system according to claim 5, wherein the height and the width of the outer profile of the table are displayed in a preselected region on the display screen.

7. A layout display control system according to claim 4, wherein said dimensional-information-display control means displays the height of the outer profile of the table by displaying a unit of length.

8. A layout display control system according to claim 7, wherein the height and the width of the outer profile of the table are displayed in a preselected region on the display screen.

9. A layout display control system according to claim 1, wherein said ruled-line data input means comprises ruled-line mode selecting means for selecting a registration mode to register the ruled lines, and wherein the ruled-line data is stored in said ruled-line data storage means when the registration mode is selected.

10. A layout display control system according to claim 1, wherein said ruled-line data input means comprises ruled-line type selection means for selecting types of ruled lines.

11. A layout display control system according to claim 10, wherein the types of ruled lines selected by said ruled-line type selection means includes a single vertical ruled line, a single horizontal ruled line, and double horizontal ruled lines.

* * * * *